C. F. ALLEN & L. W. CAMPBELL.
STEAM DRYING KILN.
No. 64,398.  Patented May 7, 1867.
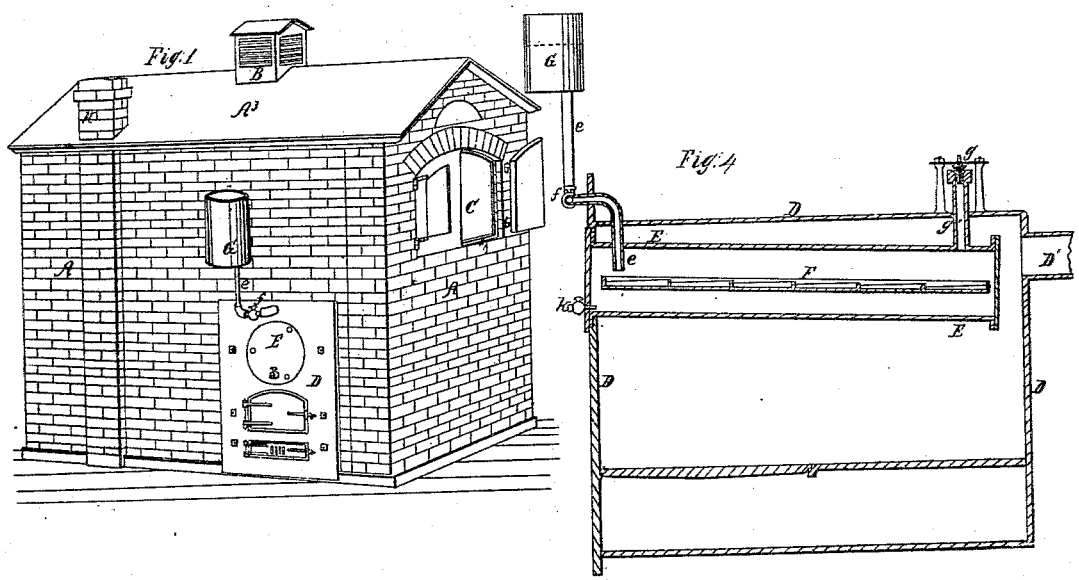
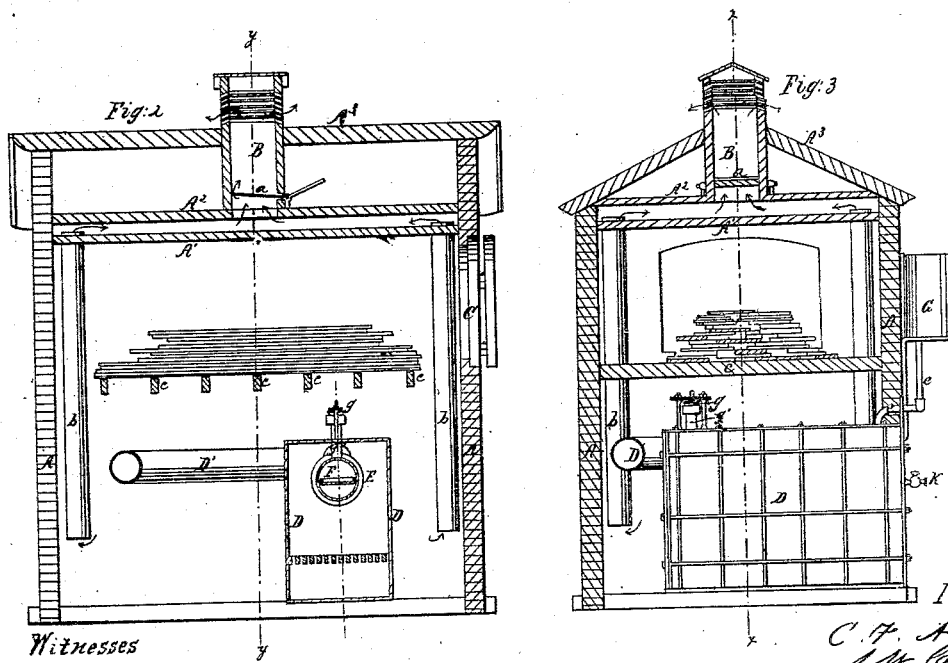
Witnesses
Inventors

United States Patent Office.

C. F. ALLEN AND LUTHER W. CAMPBELL, OF AURORA, ILLINOIS, ASSIGNORS TO THEMSELVES, A. T. HALL, AND A. J. AMBLER.

*Letters Patent No. 64,398, dated May 7, 1867.*

APPARATUS FOR DRYING AND SEASONING LUMBER BY SUPERHEATED STEAM.

*The Schedule referred to in these Letters Patent and making part of the same.*

TO WHOM IT MAY CONCERN.

Be it known that we, C. F. ALLEN and LUTHER W. CAMPBELL, of Aurora, in the county of Kane, State of Illinois, have invented a new and useful improvement in Superheated Steam Generators and Drying or Seasoning Apparatus; and we hereby declare that the following is a full, clear, and exact description thereof, reference being had to the accompanying drawings, making part of the specification, in which—

Figure 1 is a perspective view of a drying-house for seasoning lumber.

Figure 2 is a longitudinal section through the drying-house, taken in a vertical plane indicated by red line $x\, x$ in fig. 3.

Figure 3 is a transverse section through the drying-house, taken in the vertical plane indicated by red line $y\, y$ in fig. 2.

Figure 4 is a longitudinal section taken vertically through the centre of the superheating apparatus.

Similar letters of reference indicate corresponding parts in the several figures.

This invention relates to certain new and useful improvements in the production of superheated steam and the employment of the same for the purpose of drying or seasoning lumber.

The first part of our invention consists in providing for the introduction of water by its own gravity into a steam generator, in such manner that a continuous and regular supply of water can be maintained, and the water prevented from contact with the heated walls of the generator, as will be hereinafter explained. It also consists in arranging a steam-superheating apparatus within a kiln or drying-house, which latter is so constructed that all moisture arising from condensation and other causes shall be conducted out of the drying-apartment, while the dry steam shall be allowed to circulate freely through that portion of the kiln containing the lumber to be seasoned, as will be hereinafter described.

To enable others skilled in the art to understand our invention, we will describe its construction and operation.

In the accompanying drawings, A represents the drying-house or kiln, which may be constructed of masonry or of any other material, and which is covered by the double roof, $A^1\, A^2$, so as to leave a space between these roofs for carrying off air and steam saturated with moisture. In the centre of the upper roof, $A^2$, an opening is made which communicates with an air-shaft, B, that extends above the pitched roof $A^3$, and forms an exit-flue for conducting off the moist steam and air. If desirable, a balance-valve, $a$, opening outward, as shown in figs. 1 and 2, may be applied to the base of the air-shaft B, for preventing the influx of air, but this adjunct may be dispensed with. Several vertical flues, $b\, b$, communicate with the space between the two horizontal roofs or walls $A^1\, A^2$, and lead down nearly to the base of the kiln, for the purpose of carrying off the moistened or saturated steam and air which fall below the dry and more heated steam, and creating an outward draught for inducing an outward current at a point which is beneath the drying-apartment. The number and capacity of these flues or ventiducts required will depend upon the capacity of the drying-house; for ordinary purposes four flues, arranged in the four corners of the house, will be found to answer the desired purpose. At a suitable height from the foundation of the drying-house strong beams, $c\, c$, are arranged so as to form an open flooring for sustaining the lumber which is to be subjected to the steaming and seasoning process. These beams should be arranged at such distances apart as will allow of a free circulation of the steam between them. The lumber to be seasoned is introduced into the drying-apartment through the door-opening, C, which latter should have closely-fitting doors applied to it for excluding air when closed.

Having described the most preferable mode of constructing the drying-kiln, we will now describe the mode of producing dry or superheated steam for seasoning lumber which is put into said kiln.

D represents a furnace, which may be made in any suitable manner, and of any convenient form. It forms the outer wall or shell of the generator proper, and may be constructed for the use of wood or coal. The superheater or generator, E, may be made of cast iron in the form of a long pipe with closed ends or heads, or it may be made in any other form desired, so that it will constitute a suitable casing for the arrangement of the superheating apparatus within it. This generator is hung or sustained within the furnace D, in any suitable manner, and it is inclined backward, as shown in fig. 4. It is desirable, though not absolutely necessary, to have the ends or heads of the generator exposed through the front and rear walls of the furnace, for the purpose of allowing these heads to be conveniently removed when desired to clean out the interior of the generator. Inside of this cylindrical generator E, and extending the whole length of it, is a plate or shallow pan, F, which is nearly equal in width to the diameter of this generator, and which is inclined backward, as shown in fig. 4. This pan is constructed with flanged edges and transverse divisional plates, which latter are not quite as high as the flanges. Water is introduced into the generator E from an elevated reservoir, G, through a pipe, e, which is provided with a regulating cock, f, shown in figs. 1 and 4, and this water flows upon the front end of the pan F, so as to successively fill the several chambers thereof as it descends from one chamber to another. At or near the rear end of the generator E an escape-valve, g, is applied, which opens outward at a given pressure of steam within the superheater, and allows the excess of pressure to escape into the kiln. This valve should be properly loaded, so that it will open at any desired pressure, and it is applied to the upper end of a pipe, g', which leads through the crown of the furnace into the drying-chamber or kiln. The smoke and unconsumed products of combustion pass off from the furnace D through the pipe D', into the chimney H, and escape.

The operation is as follows: Fire being made in the furnace D, beneath the generator, and the proper degree of heat attained, any water which might be in this generator should be blown off through the pipe K, which is employed for this purpose. Water from the tank G is then allowed to flow freely upon the upper end of pan F, when it will be partially converted into steam. As the water continues to flow it will fill the first chamber of the said pan, and then pass on in a thin sheet and fill the next lower chamber, and so on until the process ultimates in the steam becoming superheated and ready for use. The water is first converted into saturated or common steam, and then, by being confined under a certain predetermined pressure, this steam will be dried or superheated and allowed to escape through valve g into the desiccating chamber of the kiln. The dry elastic steam rises rapidly after escaping from the generator, and circulates between the lumber upon the beams c, while the denser or more saturated particles of vapor will descend and seek the ventiducts b, where they will be carried off by the ascending draught through the roof of the kiln.

By this invention and arrangement it will be seen that the steam may be superheated or desiccated to any desired degree of pressure without injury to the generator, for the reason that the water cannot come in contact with that portion of the heated surface of the generator which is subjected to the most intense heat of the fire.

We have thus described the most preferable means for carrying our invention into practice, but we do not confine ourselves to the precise construction and arrangement of the several parts shown, as they may be modified without changing the principle of the invention.

Having described our invention, what we claim as new, and desire to secure by Letters Patent, is—

1. A superheating steam generator which is constructed and supplied with water, and arranged within a drying-kiln, substantially as described, and for the purposes explained.

2. In a drying-kiln we claim the arrangement of a divisional pan F within the generator E, for the purpose of protecting the latter from contact with water, substantially as described.

3. The floors $A^1 A^2$, with space between them, arranged at the top of the kiln, in combination with the ventiducts b leading into the kiln from beneath the drying apartment, substantially as described.

4. In combination with the escape-valve g of the superheating generator we claim the balanced valve a, communicating with the open air, substantially as described.

5. The elevated water-tank G, pipe e, pan F, in combination with a superheating generator which is adapted for drying purposes, substantially as described.

6. We claim a provision for conducting off the moisture from a point which is below the desiccating chamber of a kiln in which superheated steam is employed for drying purposes, substantially as described.

C. F. ALLEN,
L. W. CAMPBELL.

Witnesses:
    T. B. RICE,
    F. C. AMBLER.